United States Patent
Kushibiki

(10) Patent No.: US 12,462,570 B2
(45) Date of Patent: *Nov. 4, 2025

(54) INFORMATION PROCESSING DEVICE, DRIVING DIAGNOSIS METHOD, AND PROGRAM

(71) Applicant: TOYOTA JIDOSHA KABUSHIKI KAISHA, Aichi-ken (JP)

(72) Inventor: Yukiya Kushibiki, Gifu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 355 days.

This patent is subject to a terminal disclaimer.

(21) Appl. No.: 18/183,166

(22) Filed: Mar. 14, 2023

(65) Prior Publication Data

US 2023/0351762 A1 Nov. 2, 2023

(30) Foreign Application Priority Data

May 2, 2022 (JP) .................. 2022-076207

(51) Int. Cl.
*G06V 20/56* (2022.01)
*G07C 5/02* (2006.01)

(52) U.S. Cl.
CPC .............. *G06V 20/56* (2022.01); *G07C 5/02* (2013.01); *G06V 2201/07* (2022.01)

(58) Field of Classification Search
CPC ...... G06V 20/56; G06V 20/58; G06V 20/584; G06V 2201/07; G06V 2201/08;
(Continued)

(56) References Cited

U.S. PATENT DOCUMENTS 10,306,190 B1 * 5/2019 Schofield .................. B60R 1/26
12,230,132 B2 * 2/2025 Kushibiki .............. G08G 1/052
(Continued)

FOREIGN PATENT DOCUMENTS

JP 2006-321354 A 11/2006
JP 2007-172487 A 7/2007
(Continued)

OTHER PUBLICATIONS

Wang et al, Traffic Light Recognition with Hight Dynamic Range Imaging and Deep Learning, 2019, IEEE Transactions on Intelligent Transportation Systems, 20(4) 1341-1352. (Year: 2019).*
(Continued)

*Primary Examiner* — Kathleen M Broughton
(74) *Attorney, Agent, or Firm* — HAUPTMAN HAM, LLP

(57) ABSTRACT

An information processing device includes: an acquisition unit that acquires travel information related to travel of a vehicle and information as to whether a target has been recognized from a captured image captured by a camera mounted on the vehicle; a preprocessing unit that updates, when information indicating that the target has been recognized is included in the information acquired during a certain section including a certain time, information indicating that the target is not recognized at the certain time with the information indicating that the target has been recognized; and a diagnosis unit that diagnoses that an event requiring attention has occurred at each time when there is the information indicating that the target has been recognized and a detection condition based on a state of the target and the travel information is satisfied.

12 Claims, 9 Drawing Sheets

(58) Field of Classification Search
CPC ........ G06V 10/96; G07C 5/02; G07C 5/0866; G07C 5/008; G07C 5/0808; G07C 5/0841; B60R 16/02
See application file for complete search history.

(56) References Cited

U.S. PATENT DOCUMENTS

| | | |
|---|---|---|
| 2010/0198488 A1 | 8/2010 | Groitzsch et al. |
| 2014/0225749 A1 | 8/2014 | Saka |
| 2016/0101785 A1* | 4/2016 | Takahashi ............... B60K 35/22 701/31.4 |
| 2016/0210857 A1 | 7/2016 | Gao et al. |
| 2016/0349072 A1 | 12/2016 | Yoshitomi et al. |
| 2017/0161567 A1 | 6/2017 | Satomura |
| 2017/0174132 A1 | 6/2017 | Yokochi et al. |
| 2017/0243483 A1 | 8/2017 | Kaneshige et al. |
| 2017/0262709 A1* | 9/2017 | Wellington .......... G06V 10/764 |
| 2017/0308761 A1 | 10/2017 | Gillet et al. |
| 2020/0234587 A1 | 7/2020 | Girond et al. |
| 2020/0256695 A1 | 8/2020 | Girond et al. |
| 2020/0265250 A1* | 8/2020 | Oe ...................... G08G 1/09623 |
| 2020/0294401 A1* | 9/2020 | Kerecsen ............... G08G 1/205 |
| 2021/0024085 A1 | 1/2021 | Kitagawa |
| 2021/0182572 A1 | 6/2021 | Kanno |
| 2021/0224560 A1 | 7/2021 | Kim et al. |
| 2022/0317443 A1 | 10/2022 | Matsui et al. |

FOREIGN PATENT DOCUMENTS

| | | |
|---|---|---|
| JP | 2014-010674 A | 1/2014 |
| JP | 2015-014988 A | 1/2015 |
| JP | 2016-206970 A | 12/2016 |
| JP | 2020-052634 A | 4/2020 |
| JP | 2021-056575 A | 4/2021 |
| JP | 2021118002 A | 8/2021 |

OTHER PUBLICATIONS

Bao et al, Safe Driving at Traffic Lights: An Image Recognition based Approach, 2019, 20th IEEE International Conference on Mobile Data Management, pp. 1-7. (Year: 2019).*
Notice of Allowance in U.S. Appl. No. 18/181,576, mailed Nov. 14, 2024, 5pp.
Office Action in U.S. Appl. No. 18/181,576, mailed Sep. 27, 2024, 22pp.

* cited by examiner

INFORMATION PROCESSING DEVICE, DRIVING DIAGNOSIS METHOD, AND PROGRAM

CROSS-REFERENCE TO RELATED APPLICATION

This application claims priority to Japanese Patent Application No. 2022-076207 filed on May 2, 2022, incorporated herein by reference in its entirety.

BACKGROUND

1. Technical Field

The present disclosure relates to an information processing device, a driving diagnosis method, and a program.

2. DESCRIPTION OF RELATED ART

Japanese Unexamined Patent Application Publication No. 2021-118002 (JP 2021-118002 A) discloses a vehicle distance measurement method for measuring the inter-vehicle distance based on vehicle image. This vehicle distance measurement method includes: a step of acquiring a traveling image captured by an imaging device of a first vehicle during traveling; a step of detecting a second vehicle from the acquired traveling image; a step of detecting, when the second vehicle is not detected from the traveling image, a first feature point of a second vehicle region from a first frame corresponding to a frame in which the second vehicle has been detected, which exists before the frame in which the second vehicle is not detected, among a plurality of frames constituting the traveling image; a step of detecting a second feature point in a second frame corresponding to the current frame by tracking the detected first feature point; a step of calculating a feature point change value between the first feature point and the second feature point; and a step of calculating a distance between the imaging device of the first vehicle and the second vehicle based on the calculated feature point change value.

SUMMARY

When driving diagnosis is performed using a server outside a vehicle or the like, the related art requires image data to be transmitted from the vehicle to the server, which places a heavy burden on a communication circuit.

An object of the present disclosure is to provide an information processing device, a driving diagnosis method, and a program capable of reducing the amount of communication when driving diagnosis is performed outside a vehicle.

An information processing device according to at least one embodiment of the instant application includes: an acquisition unit that acquires travel information related to travel of a vehicle and information as to whether a target has been recognized from a captured image captured by a camera mounted on the vehicle; a preprocessing unit that updates, when information indicating that the target has been recognized is included in the information acquired during a certain section including a certain time, information indicating that the target is not recognized at the certain time with the information indicating that the target has been recognized; and a diagnosis unit that diagnoses that an event requiring attention has occurred at each time when there is the information indicating that the target has been recognized and a detection condition based on a state of the target and the travel information is satisfied.

In the information processing device according to at least one embodiment of the instant application, the acquisition unit acquires travel information related to travel of a vehicle and information as to whether a target has been recognized from a captured image captured by a camera mounted on the vehicle. Here, the target is, for example, a vehicle ahead, a traffic light, or the like. When information indicating that the target has been recognized is included in the information acquired during a certain section including a certain time, the preprocessing unit updates information indicating that the target is not recognized at the certain time with the information indicating that the target has been recognized. The diagnosis unit diagnoses that an event requiring attention has occurred at each time when there is the information indicating that the target has been recognized and a detection condition based on a state of the target and the travel information is satisfied. The event requiring attention here includes, for example, shortening the inter-vehicle distance, significantly falling behind the vehicle ahead at the time of starting, and not stopping despite a red light. The condition based on the state of the target and the travel information is a condition defined using the state of the target and the travel information for diagnosing that an event requiring attention has occurred.

In the information processing device, travel information related to travel of a vehicle and information as to whether a target has been recognized from a captured image captured by a camera mounted on the vehicle are acquired. Therefore, according to the information processing device, it is possible to reduce the amount of communication when the driving diagnosis is performed outside the vehicle.

The information processing device according to at least one embodiment of the instant application further includes an extraction unit that extracts the captured image when the detection condition is satisfied.

In the information processing device according to at least one embodiment of the instant application, the captured image is extracted when the detection condition is satisfied. According to the information processing device, it is possible to record a captured image when an event requiring attention occurs.

In the information processing device according to at least one embodiment of the instant application, the extraction unit terminates extraction of the captured image when the detection condition is no longer satisfied.

In the information processing device according to at least one embodiment of the instant application, the extraction of the captured image is terminated when the detection condition is no longer satisfied. According to the information processing device, it is possible to appropriately terminate the extraction of the captured image when it is diagnosed that an event requiring attention has occurred.

In the information processing device according to at least one embodiment of the instant application, the extraction unit deletes the extracted captured image when a predetermined detection cancellation condition based on the travel information is satisfied.

In the information processing device according to at least one embodiment of the instant application, the extraction unit deletes the extracted captured image when a predetermined detection cancellation condition based on the travel information is satisfied. According to the information processing device, the predetermined detection cancellation condition here is a condition for deleting the diagnosis that an event requiring attention has occurred and diagnosing that an event requiring attention has not occurred. According to the information processing device, after it is once diagnosed that an event requiring attention has occurred, when it is diagnosed that an event requiring attention has not occurred, it is possible to delete the extracted captured image.

In a driving diagnosis method according to at least one embodiment of the instant application, a computer executes processes including: acquiring travel information related to travel of a vehicle and information as to whether a target has been recognized from a captured image captured by a camera mounted on the vehicle; updating, when information indicating that the target has been recognized is included in the information acquired during a certain section including a certain time, information indicating that the target is not recognized at the certain time with the information indicating that the target has been recognized; and diagnosing that an event requiring attention has occurred at each time when there is the information indicating that the target has been recognized and a detection condition based on a state of the target and the travel information is satisfied.

In the driving diagnosis method according to at least one embodiment of the instant application, the computer acquires travel information related to travel of a vehicle and information as to whether a target has been recognized from a captured image captured by a camera mounted on the vehicle. When information indicating that the target has been recognized is included in the information acquired during a certain section including a certain time, the computer updates information indicating that the target is not recognized at the certain time with the information indicating that the target has been recognized. The computer diagnoses that an event requiring attention has occurred at each time when there is the information indicating that the target has been recognized and a detection condition based on a state of the target and the travel information is satisfied.

In the driving diagnosis method, travel information related to travel of a vehicle and information as to whether a target has been recognized from a captured image captured by a camera mounted on the vehicle are acquired. Therefore, according to the driving diagnosis method, it is possible to reduce the amount of communication when the driving diagnosis is performed outside the vehicle.

A program according to at least one embodiment of the instant application is a program that causes a computer to execute processes including: acquiring travel information related to travel of a vehicle and information as to whether a target has been recognized from a captured image captured by a camera mounted on the vehicle; updating, when information indicating that the target has been recognized is included in the information acquired during a certain section including a certain time, information indicating that the target is not recognized at the certain time with the information indicating that the target has been recognized; and diagnosing that an event requiring attention has occurred at each time when there is the information indicating that the target has been recognized and a detection condition based on a state of the target and the travel information is satisfied.

In the program according to at least one embodiment of the instant application, the computer acquires travel information related to travel of a vehicle and information as to whether a target has been recognized from a captured image captured by a camera mounted on the vehicle. When information indicating that the target has been recognized is included in the information acquired during a certain section including a certain time, the computer updates information indicating that the target is not recognized at the certain time with the information indicating that the target has been recognized. The computer diagnoses that an event requiring attention has occurred at each time when there is the information indicating that the target has been recognized and a detection condition based on a state of the target and the travel information is satisfied.

In the program, travel information related to travel of a vehicle and information as to whether a target has been recognized from a captured image captured by a camera mounted on the vehicle are acquired. Therefore, according to the program, it is possible to reduce the amount of communication when the driving diagnosis is performed outside the vehicle.

According to the present disclosure, it is possible to reduce the amount of communication when the driving diagnosis is performed outside the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A driving diagnosis system including an information processing device of the present disclosure will be described. The driving diagnosis system is a system that performs driving diagnosis using information of targets recognized from captured images of a camera mounted on a vehicle and travel information of the vehicle. In the driving diagnosis system, a captured image is recorded when it is determined that an event requiring attention has occurred.

Overall Configuration

Figure 1:
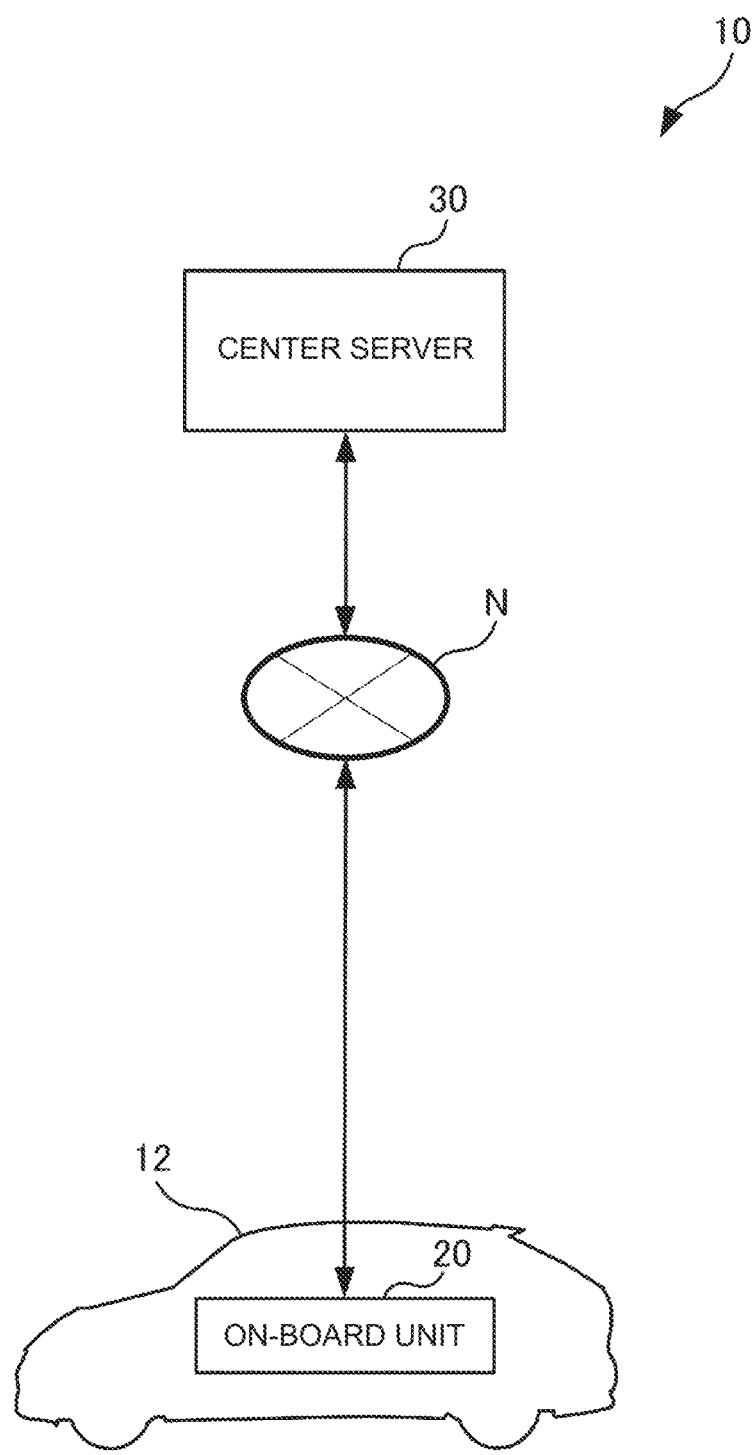
FIG. 1 is a diagram showing a schematic configuration of a driving diagnosis system according to the present embodiment.

As shown in FIG. 1, a driving diagnosis system 10 according to the present embodiment includes a vehicle 12 and a center server 30 serving as an information processing device. The vehicle 12 is equipped with an on-board unit 20. The on-board unit 20 and the center server 30 are connected to each other through a network N. Although FIG. 1 shows one vehicle 12 and one on-board unit 20 with respect to one center server 30, the numbers of the vehicles 12 and the on-board units 20 are not limited to one.

The center server 30 is installed in, for example, a manufacturer that manufactures the vehicle 12, a car dealer, or any business operator.

Vehicle

Figure 2:
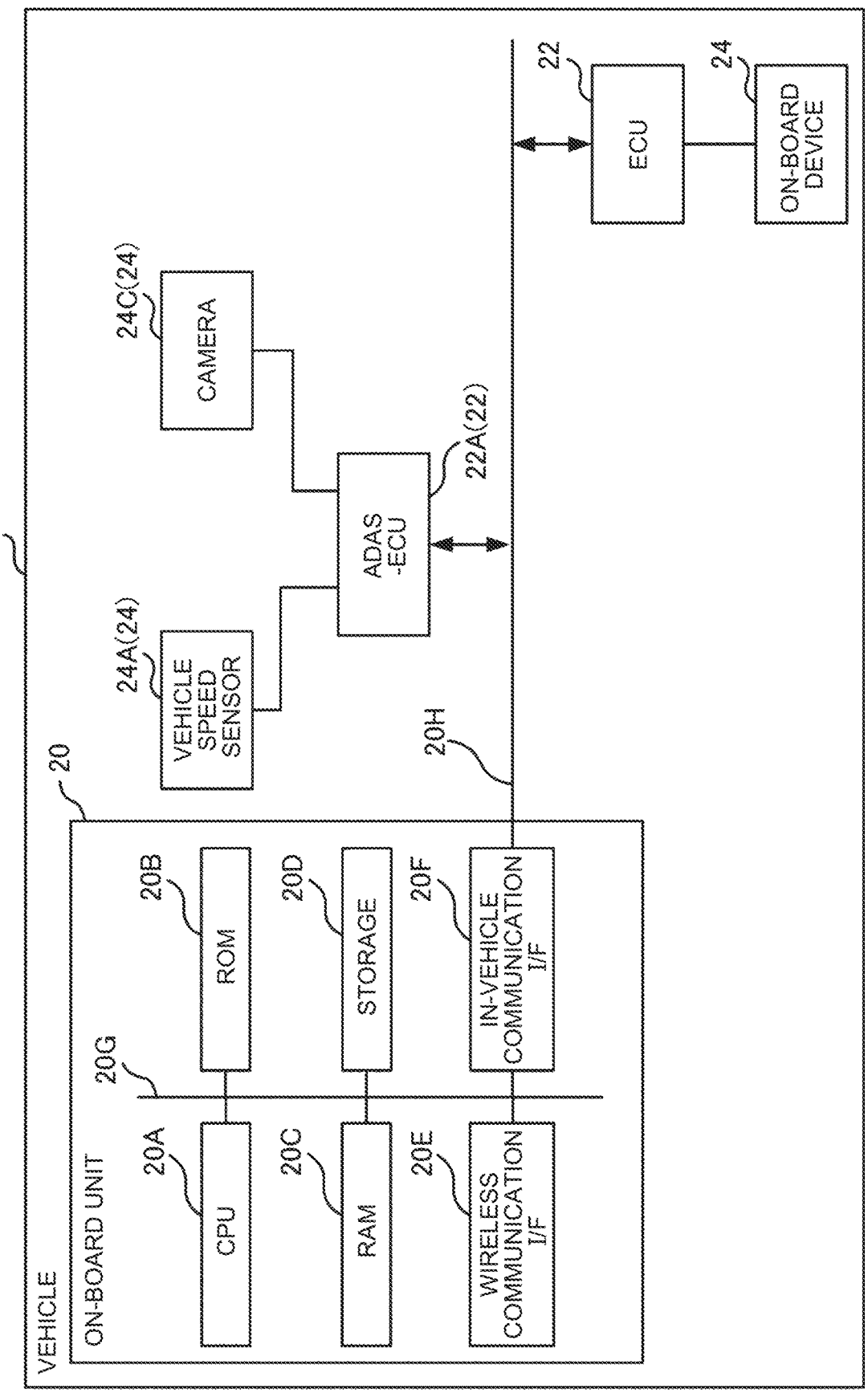
FIG. 2 is a block diagram showing a hardware configuration of a vehicle according to the present embodiment.

As shown in FIG. 2, the vehicle 12 according to the present embodiment includes the on-board unit 20, a plurality of electronic control units (ECUs) 22, and a plurality of on-board devices 24.

The on-board unit 20 includes a central processing unit (CPU) 20A, a read-only memory (ROM) 20B, a random access memory (RAM) 20C, a storage 20D, a wireless communication interface (I/F) 20E, and an in-vehicle communication I/F 20F. The CPU 20A, the ROM 20B, the RAM 20C, the storage 20D, the wireless communication I/F 20E, and the in-vehicle communication I/F 20F are connected so as to be able to communicate with each other via an internal bus 20G.

The CPU 20A is a central processing unit that executes various programs and controls various units. That is, the CPU 20A reads a program from the ROM 20B or the storage 20D and executes the program using the RAM 20C as a work area.

Figure 3:
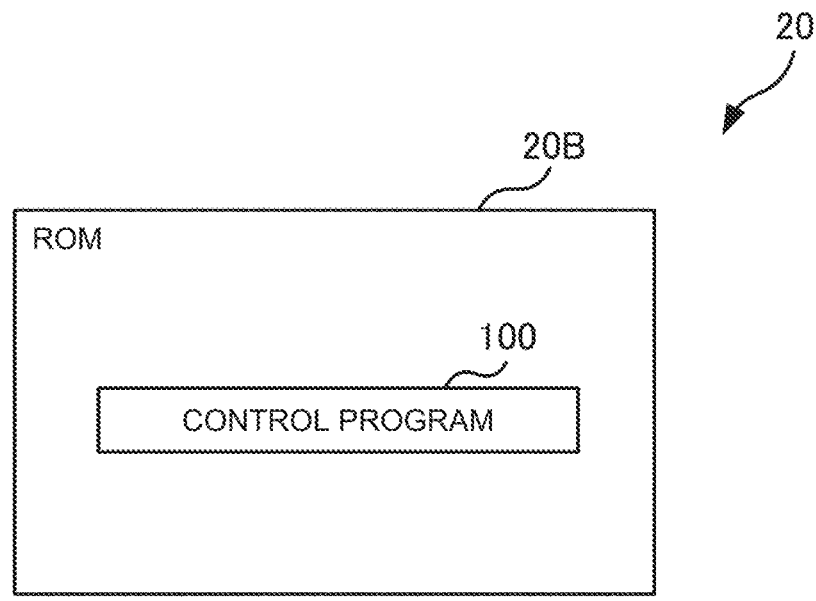
FIG. 3 is a block diagram showing a configuration of a read-only memory (ROM) of an on-board unit according to the present embodiment.

The ROM 20B stores various programs and various data. As shown in FIG. 3, a control program 100 is stored in the ROM 20B of the present embodiment. The control program 100 is a program for transmitting, to the center server 30, information of a target recognized from the image captured by the camera.

As shown in FIG. 2, the RAM 20C temporarily stores a program or data as a work area.

Figure 4:
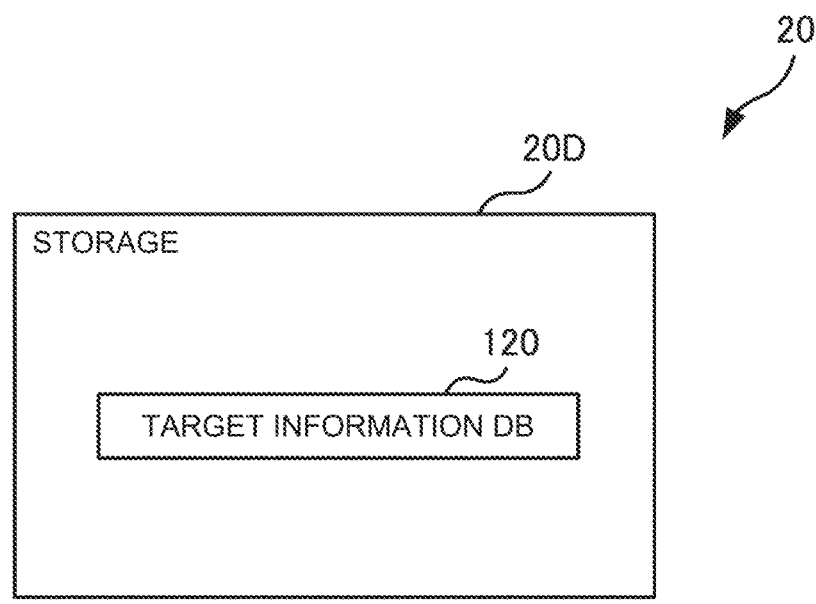
FIG. 4 is a block diagram showing a configuration of a storage of the on-board unit according to the present embodiment.

The storage 20D that is a memory is composed of a hard disk drive (HDD) or a solid state drive (SSD), and stores various programs and various data. As shown in FIG. 4, the storage 20D of the present embodiment stores a target database (DB) 120, which is a data group of the information of the recognized targets. Note that the storage 20D may store the control program 100 and the target information DB 120.

As shown in FIG. 2, the wireless communication OF 20E is a wireless communication module for communicating with the center server 30. For the wireless communication module, for example, communication standards such as fifth generation (5G), long term evolution (LTE), and Wi-Fi (registered trademark) are used. The wireless communication OF 20E is connected to the network N.

The in-vehicle communication OF 20F is an interface for connecting to each of the ECUs 22. For the interface, a communication standard based on a controller area network (CAN) protocol is used. The in-vehicle communication I/F 20F is connected to an external bus 20H.

The ECUs 22 include at least an advanced driver assistance system (ADAS)-ECU 22A.

The ADAS-ECU 22A controls an advanced driver assistance system in an integrated manner. A vehicle speed sensor 24A and a camera 24C that constitute the on-board devices 24 are connected to the ADAS-ECU 22A. The camera 24C is a camera that captures images of the surroundings of the vehicle 12.

Figure 5:
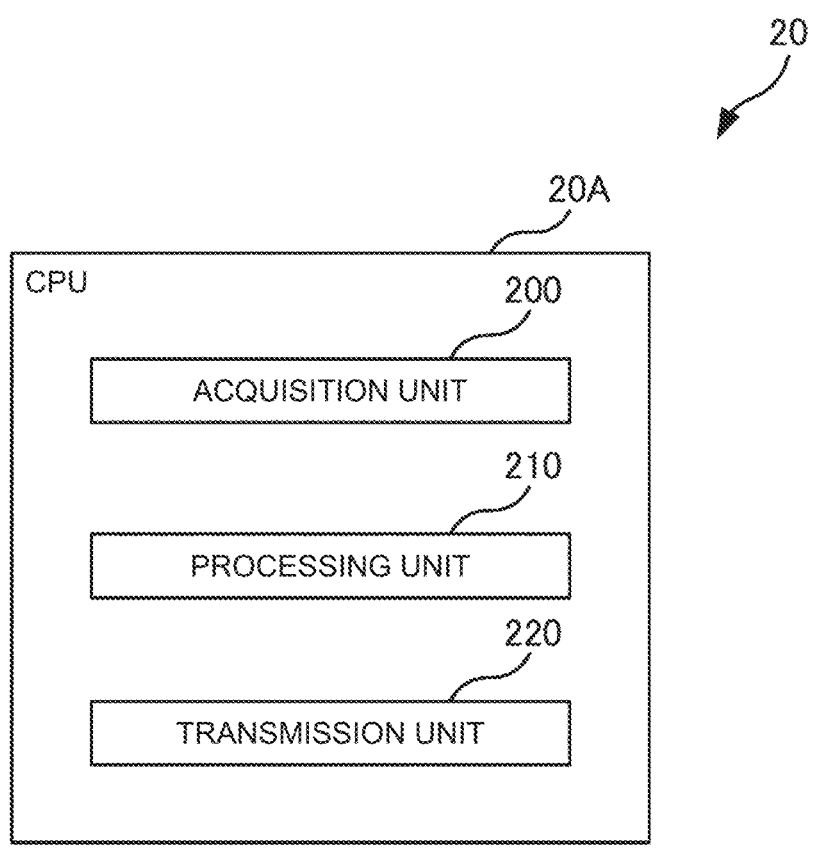
FIG. 5 is a block diagram showing a functional configuration of the on-board unit according to the present embodiment.

As shown in FIG. 5, in the on-board unit 20 of the present embodiment, the CPU 20A functions as an acquisition unit 200, a processing unit 210, and a transmission unit 220 by executing the control program 100.

The acquisition unit 200 has a function of acquiring vehicle information and the captured images. The vehicle information is information such as the state of the on-board devices 24 and the state of the vehicle 12 obtained from the on-board devices 24. The captured image is a captured image of the outside of the vehicle 12 captured by the camera 24C of the vehicle 12. The vehicle information of the present embodiment includes travel information such as position information and vehicle speed.

The processing unit 210 causes the storage 20D to store the vehicle information acquired by the acquisition unit 200, and recognizes the target from the captured images captured by the camera 24C, thereby converting the images into information of the target. Specifically, the processing unit 210 of the present embodiment causes the storage 20D to temporarily store the vehicle information and the information of the target, and then transmits the vehicle information and the information of the target to the center server 30 via the transmission unit 220. The processing unit 210 also transmits the captured images to the center server 30 via the transmission unit 220 when requested by the center server 30. The processing unit 210 also converts the captured images captured by the camera 24C into information by image recognition processing to obtain the information of the target.

More specifically, the processing unit 210 recognizes a vehicle ahead and a signal of a traffic light as targets represented by the captured images, and converts them into information of the vehicle ahead (a flag indicating whether there is a vehicle ahead, an inter-vehicle distance from the vehicle ahead, and an inter-vehicle time) and information of the signal of the traffic light (a flag representing whether there is a red light, a flag representing whether there is a green light, and the distance from the traffic light). The inter-vehicle time is calculated from the inter-vehicle distance and the vehicle speed.

The transmission unit 220 has a function of transmitting the vehicle information and the information of the target stored in the storage 20D to the center server 30. Specifically, the transmission unit 220 of the present embodiment transmits the vehicle information and the information of the target stored in the storage 20D to the center server 30 when requested by the center server 30.

The transmission unit 220 also transmits the captured images captured by the camera 24C to the center server 30 when requested by the center server 30.

Center Server

Figure 6:
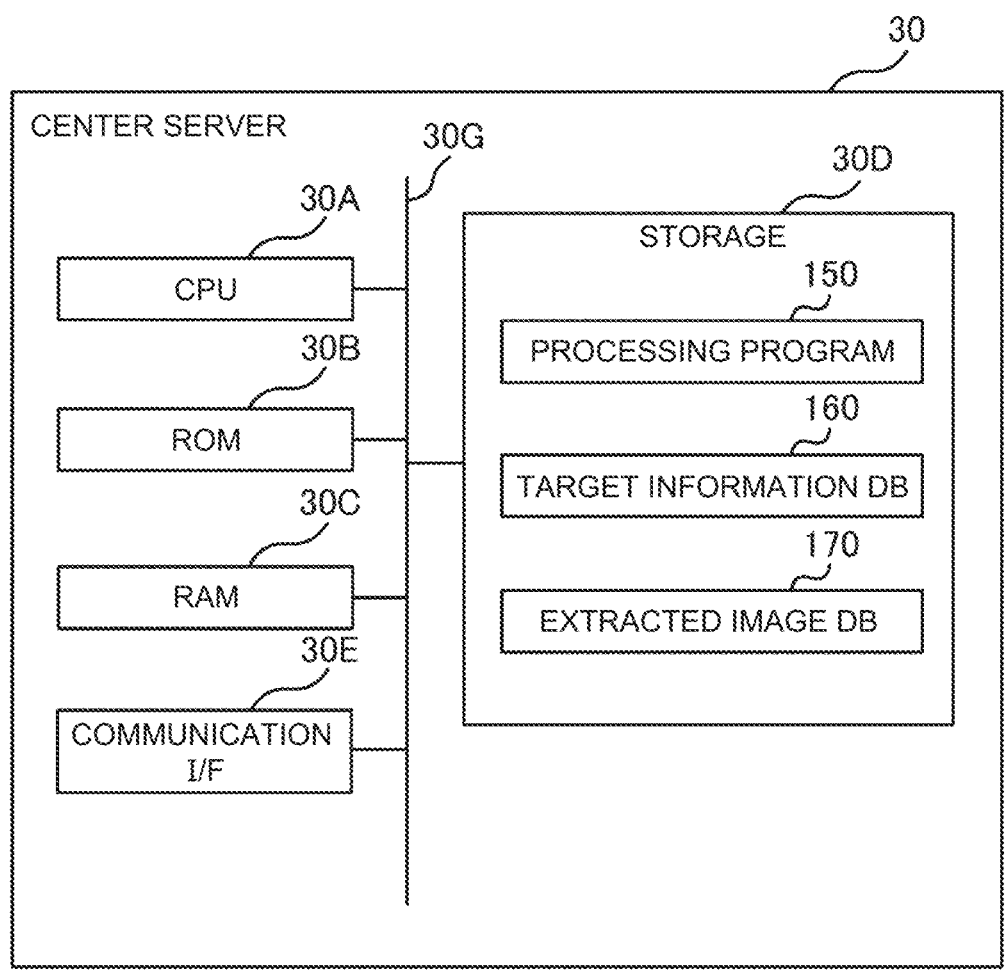
FIG. 6 is a block diagram showing a hardware configuration of a center server according to the present embodiment.

As shown in FIG. 6, the center server 30 includes a CPU 30A, a ROM 30B, a RAM 30C, a storage 30D, and a communication OF 30E. The CPU 30A, the ROM 30B, the RAM 30C, the storage 30D, and the communication OF 30E are connected so as to be able to communicate with each other via an internal bus 30G. The functions of the CPU 30A, the ROM 30B, the RAM 30C, the storage 30D, and the communication OF 30E are the same as those of the CPU 20A, the ROM 20B, the RAM 20C, the storage 20D, and the wireless communication OF 20E of the on-board unit 20 described above. The communication OF 30E may perform wired communication. The CPU 30A is an example of a processor.

A processing program 150 as a program, a target information DB 160, and an extracted image DB 170 are stored in the storage 30D of the present embodiment. Note that the ROM 30B may store the processing program 150.

The processing program 150 is a program for controlling the center server 30. With the execution of the processing program 150, the center server 30 acquires the information of the target and the travel information from the vehicle 12 and executes various processes for performing the driving diagnosis on the travel information of the vehicle 12.

The information of the target acquired from the vehicle 12 is stored in the target information DB 160.

Specifically, the information of the vehicle ahead (a flag indicating whether there is a vehicle ahead, an inter-vehicle distance from the vehicle ahead, and an inter-vehicle time) and the information of the signal of the traffic light (a flag representing whether there is a red light, a flag representing whether there is a green light, and the distance from the traffic light), which are acquired from the vehicle 12, are stored in the target information DB 160.

The extracted image DB 170 stores captured images when it is diagnosed that an event requiring attention has occurred.

Figure 7:
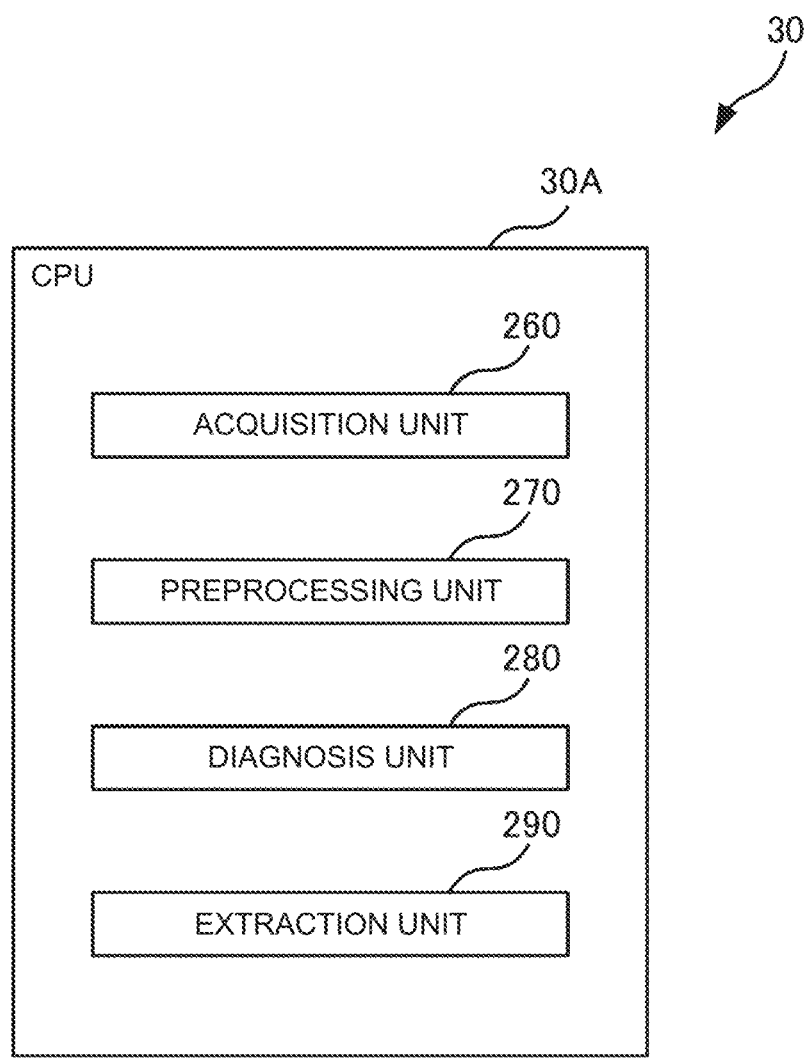
FIG. 7 is a block diagram showing a functional configuration of the center server according to the present embodiment.

As shown in FIG. 7, in the center server 30 of the present embodiment, the CPU 30A functions as an acquisition unit 260, a preprocessing unit 270, a diagnosis unit 280, and an extraction unit 290 by executing the processing program 150.

The acquisition unit 260 has a function of acquiring the vehicle information of the vehicle 12 and the information of the target from the on-board unit 20 of the vehicle 12. The acquisition unit 260 causes the target information DB 160 to store the acquired information of the target.

When information indicating that the target has been recognized is included in the information of the target acquired during a certain section including a certain time, the preprocessing unit 270 updates information indicating that the target is not recognized at that time with the information indicating that the target has been recognized.

Specifically, when the recognized target is a vehicle ahead and the information of the target is a flag indicating that there is a vehicle ahead, the preprocessing unit 270 records a vehicle ahead flag. Then, in order to avoid erroneous detection or undetection of the vehicle ahead, a filtering process is performed by replacing the flag indicating that there is a vehicle ahead with the maximum value in the certain section of 0.2 seconds before and after, to update all the flags in the certain section with the maximum value.

When the recognized target is a signal of a traffic light and the information of the target is a flag representing a red light, the preprocessing unit 270 records a red light flag. Then, in order to avoid erroneous detection or undetection of the red light, a filtering process is performed by replacing the flag representing a red light with the maximum value in the certain section of 1 second before and after, to update all the flags in the certain section with the maximum value.

When the recognized target is a signal of a traffic light and the information of the target is a flag representing a green light, the preprocessing unit 270 records a green light flag. Then, in order to avoid erroneous detection or undetection of the green light, a filtering process is performed by replacing the flag representing a green light with the maximum value in the certain section of 1 second before and after, to update all the flags in the certain section with the maximum value.

The diagnosis unit 280 diagnoses that an event requiring attention has occurred when the information of the target acquired from the on-board unit 20 of the vehicle 12 at each time is information indicating that the target has been recognized based on the vehicle information and the information of the target acquired from the on-board unit 20 of the vehicle 12, and when a detection condition based on the state of the target and the travel information included in the vehicle information acquired from the on-board unit 20 of the vehicle 12 is satisfied.

Specifically, the diagnosis unit 280 diagnoses whether an event requiring attention has occurred on the detection condition that the inter-vehicle distance is shortened while the vehicle 12 is traveling or stopped.

For example, assume that the detection condition is that the flag indicates that there is a vehicle ahead, the vehicle 12 is traveling (vehicle speed>10 km/h), and the inter-vehicle time<0.5 seconds holds. Alternatively, assume that the detection condition is that the flag indicates that there is a vehicle ahead, the vehicle 12 is stopped (vehicle speed<0.5 km/h), and the inter-vehicle distance<1500 mm holds.

Further, the diagnosis unit 280 diagnoses whether an event requiring attention has occurred on the detection condition that the vehicle is significantly behind the vehicle ahead when starting at an intersection or in a traffic jam.

For example, when the flag indicates that there is a vehicle ahead and the vehicle speed<0.5 km/h holds, it is provisionally diagnosed that an event requiring attention has occurred, and when there is a vehicle ahead while the vehicle 12 is stopped and the maximum inter-vehicle distance—the minimum inter-vehicle distance while the vehicle 12 is stopped≥25000 mm holds, it is diagnosed that an event requiring attention has occurred.

When the vehicle stopped time>120 seconds holds, the vehicle 12 is considered to be parked, the provisional diagnosis that an event requiring attention has occurred is deleted, and it is diagnosed that an event requiring attention has not occurred. When the distance from the vehicle ahead>15000 mm holds, the provisional diagnosis that an event requiring attention has occurred is deleted, and it is diagnosed that an event requiring attention has not occurred. When turning right or left (the turn signal switch is ON), there is a high possibility that the start will be delayed, so the provisional diagnosis that an event requiring attention has occurred is deleted, and it is diagnosed that an event requiring attention has not occurred.

Further, the diagnosis unit 280 diagnoses whether an event requiring attention has occurred on the detection condition that the vehicle 12 does not stop despite the red light.

For example, when the flag representing the red light is ON, it is provisionally diagnosed that an event requiring attention has occurred, and when the minimum vehicle speed is less than a threshold value (1 km/h), the provisional diagnosis that an event requiring attention has occurred is deleted, and it is diagnosed that an event requiring attention has not occurred.

When the turn signal switch is ON, it is assumed that an arrow signal is lit, so the provisional diagnosis that an event requiring attention has occurred is deleted, and it is diagnosed that an event requiring attention has not occurred.

When the vehicle is constantly 10 m or more away from the traffic light while recognizing a red light, the provisional diagnosis that an event requiring attention has occurred is deleted, and it is diagnosed that an event requiring attention has not occurred.

When the traffic light is immediately switched from red to green, the provisional diagnosis that an event requiring attention has occurred is deleted, and it is diagnosed that an event requiring attention has not occurred.

When the detection condition is satisfied, the extraction unit 290 requests the captured image from the on-board unit 20 of the vehicle 12, extracts the captured image acquired from the on-board unit 20 of the vehicle 12, and causes the extracted image DB 170 to store the image.

When the detection condition is no longer satisfied, the extraction unit 290 terminates the extraction of the captured image acquired from the on-board unit 20 of the vehicle 12, and causes the extracted image DB 170 to store the extracted captured image.

The extraction unit 290 deletes the extracted captured image when a predetermined detection cancellation condition based on the travel information is satisfied.

Specifically, when the detection condition that the flag indicates that there is a vehicle ahead, the vehicle 12 is traveling (vehicle speed>10 km/h), and the inter-vehicle time<0.5 seconds holds or the detection condition that the flag indicates that there is a vehicle ahead, the vehicle 12 is stopped (vehicle speed<0.5 km/h), and the inter-vehicle distance<1500 mm holds is satisfied, the extraction of the captured image acquired from the on-board unit 20 of the vehicle 12 is started, and when the detection condition is no longer satisfied, the extraction of the captured image is terminated, and the extracted captured image is stored in the extracted image DB 170.

When the detection condition that the flag indicates that there is a vehicle ahead and the vehicle speed<0.5 km/h holds is satisfied, the extraction of the captured image acquired from the on-board unit 20 of the vehicle 12 is started, and when the detection condition is no longer satisfied, the extraction of the captured image is terminated. When there is a vehicle ahead while the vehicle 12 is stopped and the maximum inter-vehicle distance—the minimum inter-vehicle distance while the vehicle 12 is stopped≥25000 mm holds, the extracted captured image is stored in the extracted image DB 170.

When the detection cancellation condition is satisfied on the detection cancellation condition that the vehicle stopped time>120 seconds holds, the extracted captured image is deleted.

When the detection cancellation condition is satisfied on the detection cancellation condition that the distance from the vehicle ahead>15000 mm holds, the extracted captured image is deleted.

When the detection cancellation condition is satisfied on the detection cancellation condition that the vehicle 12 is making a right or left turn (the turn signal switch is ON), the extracted captured image is deleted.

When the detection condition that the flag representing the red light is ON is satisfied, the extraction of the captured image acquired from the on-board unit 20 of the vehicle 12 is started, and when the detection condition is no longer satisfied, the extraction of the captured image is terminated, and the extracted captured image is stored in the extracted image DB 170.

When the detection cancellation condition is satisfied on the detection cancellation condition that the minimum vehicle speed is less than a threshold value (1 km/h), the extracted captured image is deleted.

When the detection cancellation condition is satisfied on the detection cancellation condition that the turn signal switch is ON, it is assumed that an arrow signal is lit, and the extracted captured image is deleted.

When the detection cancellation condition is satisfied on the detection cancellation condition that the vehicle 12 is constantly 10 m or more away from the traffic light while recognizing a red light, the extracted captured image is deleted.

When the detection cancellation condition is satisfied on the detection cancellation condition that the traffic light is immediately switched from red to green, the extracted captured image is deleted.

Flow of Control

The flow of processes executed by the driving diagnosis system 10 of the present embodiment will be described with reference to the flowcharts of FIG. 8 to FIG. 10.

The processes in the on-board unit 20 are executed by the CPU 20A of the on-board unit 20 functioning as the acquisition unit 200, the processing unit 210, and the transmission unit 220. The processes in the center server 30 are executed by the CPU 30A of the center server 30 functioning as the acquisition unit 260, the preprocessing unit 270, the diagnosis unit 280, and the extraction unit 290.

Figure 8:
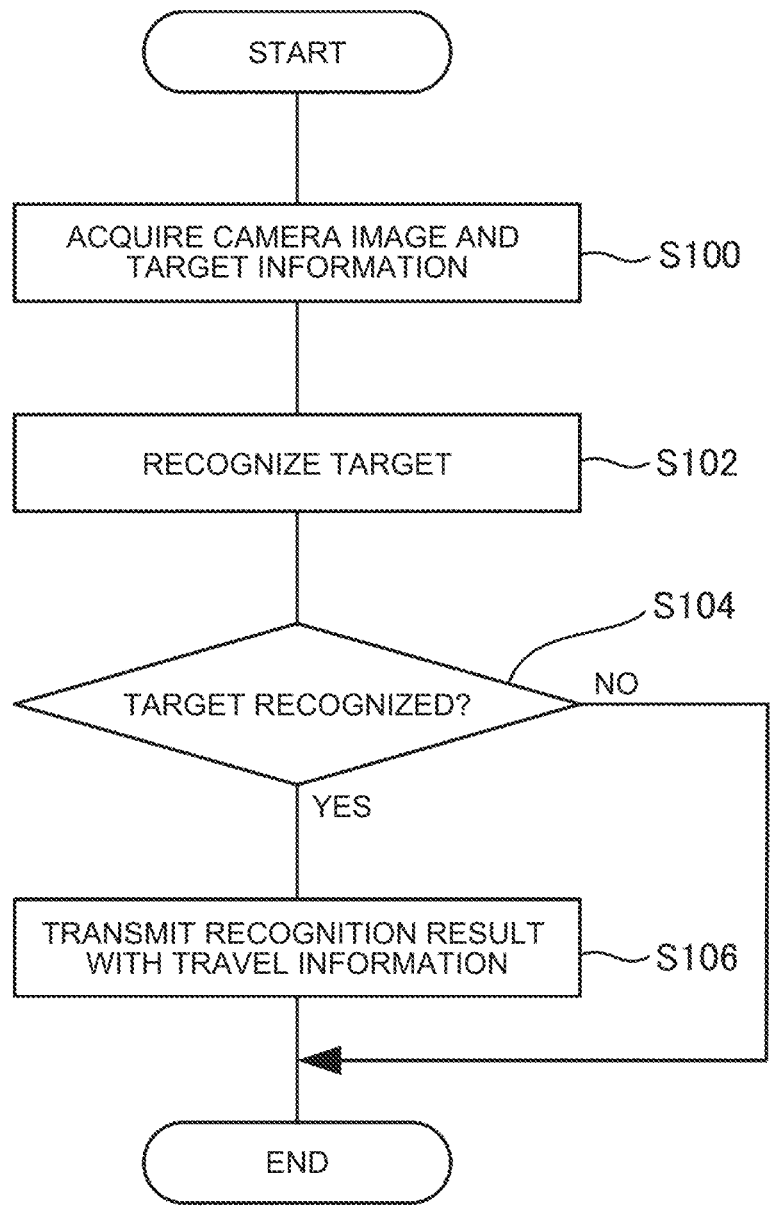
FIG. 8 is a flowchart showing a flow of a target information transmission process executed in the on-board unit according to the present embodiment.

First, while the vehicle 12 is traveling, the CPU 20A of the on-board unit 20 repeatedly executes the target information transmission process shown in FIG. 8.

In step S100 of FIG. 8, the acquisition unit 200 acquires the captured image of the outside of the vehicle 12, which is captured by the camera 24C, and acquires the travel information.

In step S102, the processing unit 210 recognizes the target from the captured image captured by the camera 24C, converts the image into information of the target, and causes the target information DB 120 to temporarily store the information.

In step S104, the processing unit 210 determines whether the target has been recognized by the process in step S102. When the target has been recognized by the process in step S102, the process proceeds to step S106. On the other hand, when the target is not recognized by the process in step S102, the target information transmission process is terminated.

In step S106, the transmission unit 220 transmits the information of the target obtained as the recognition result in step S102 to the center server 30 together with the travel information, and ends the target information transmission process.

Figure 9:
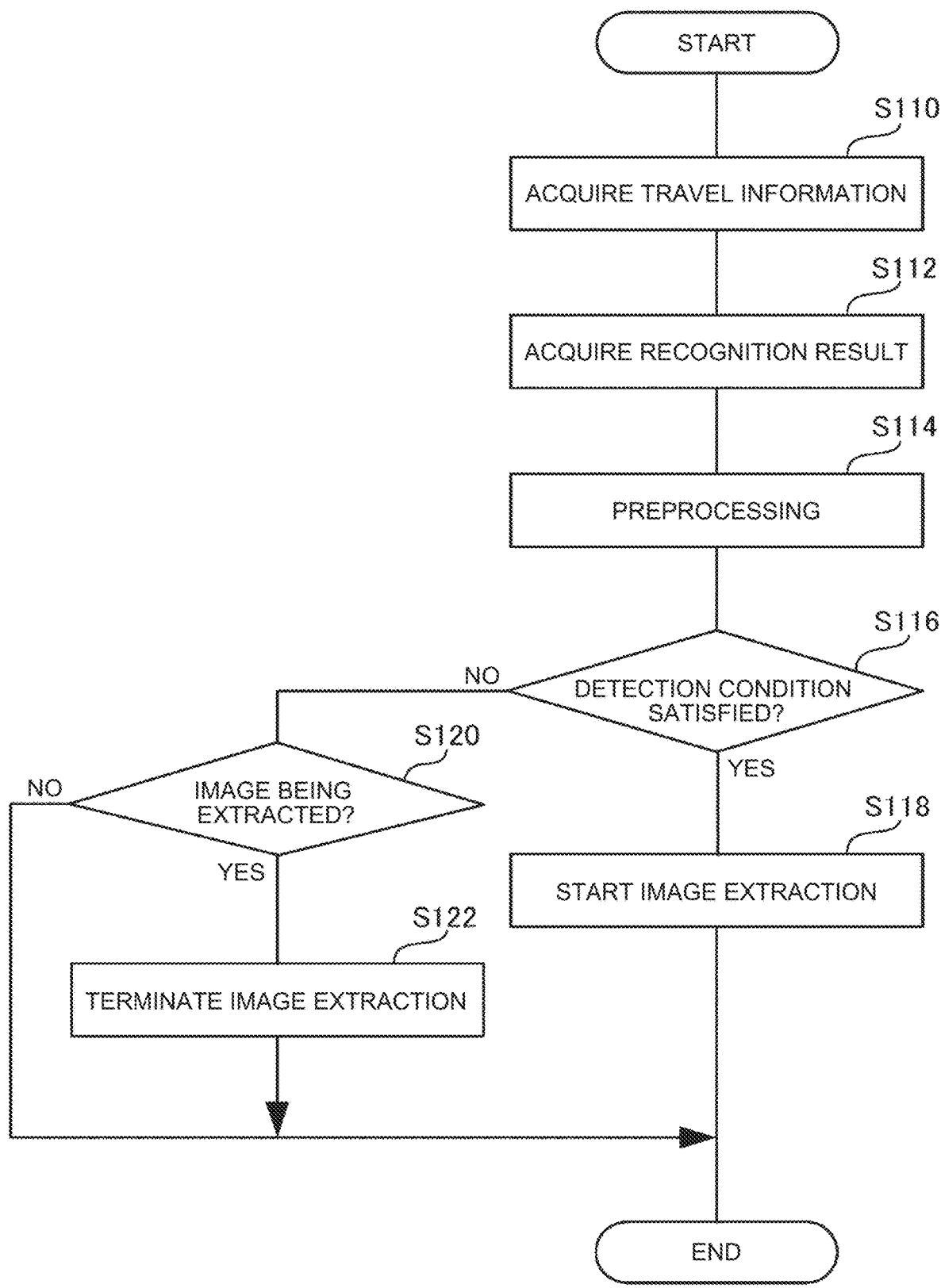
FIG. 9 is a flowchart showing a flow of a driving diagnosis process executed in the center server according to the present embodiment.
Figure 10:
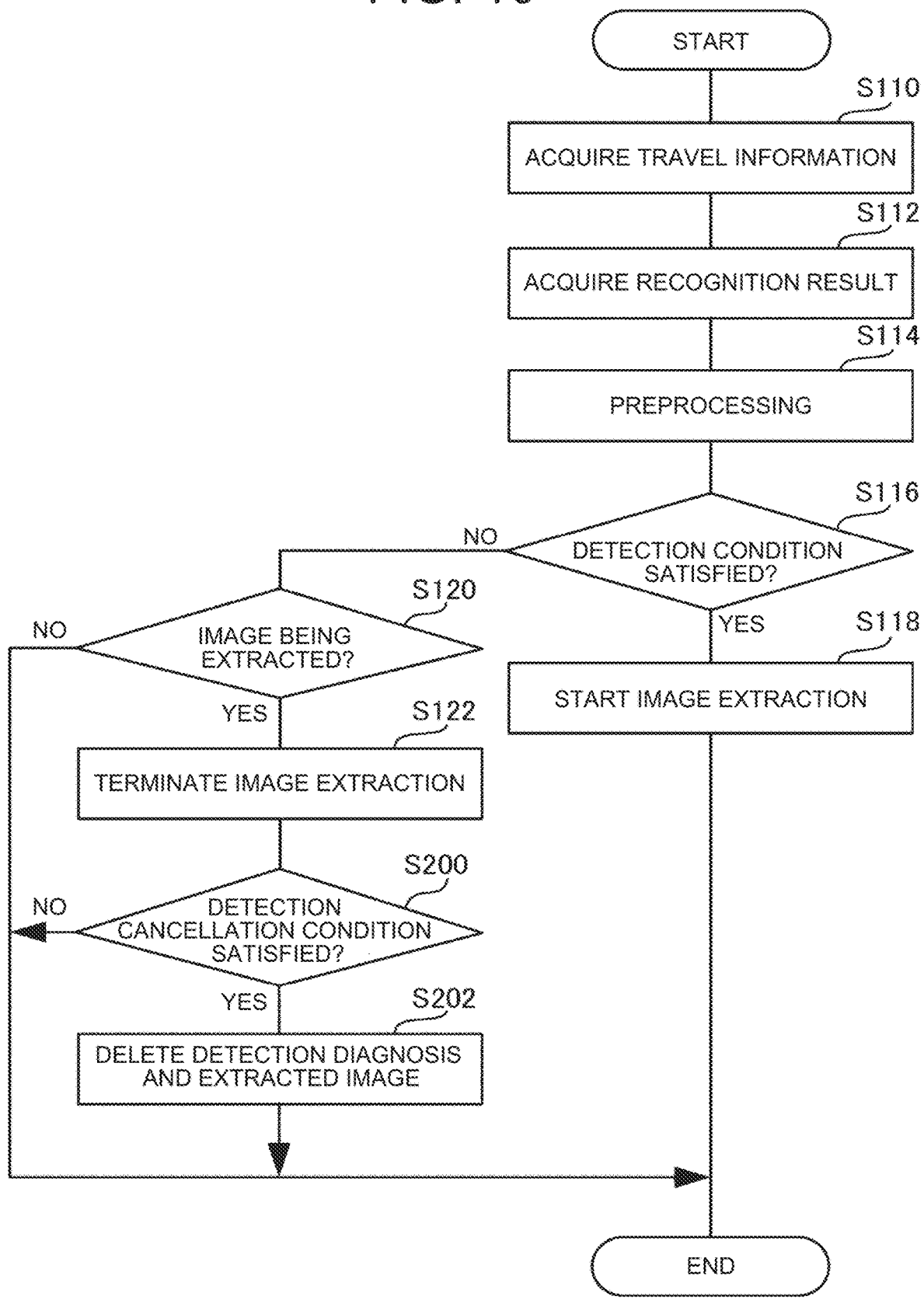
FIG. 10 is a flowchart showing the flow of the driving diagnosis process executed in the center server according to the present embodiment.

In the center server 30, the CPU 30A repeatedly executes the driving diagnosis process shown in FIG. 9 to FIG. 10.

Specifically, the CPU 30A repeatedly executes the driving diagnosis process shown in FIG. 9 for diagnosing that the inter-vehicle distance is shortened as an event requiring attention.

In step S110 of FIG. 9, the acquisition unit 260 acquires the travel information of the vehicle 12 from the on-board unit 20 of the vehicle 12.

In step S112, the acquisition unit 260 acquires the information of the target from the on-board unit 20 of the vehicle 12.

In step S114, in the case where the recognized target is a vehicle ahead, when the flag indicates that there is a vehicle ahead, the preprocessing unit 270 records a vehicle ahead flag. Then, in order to avoid erroneous detection or undetection of the vehicle ahead, a filtering process is performed by replacing the flag indicating that there is a vehicle ahead with the maximum value in the certain section of 0.2 seconds before and after, to update all the flags in the certain section with the maximum value.

In step S116, the diagnosis unit 280 diagnoses whether an event requiring attention has occurred on the detection condition that the inter-vehicle distance is shortened while the vehicle 12 is traveling or stopped. When the detection condition is satisfied, it is diagnosed that an event requiring attention has occurred, and the process proceeds to step S118. On the other hand, when the detection condition is not satisfied, the process proceeds to step S120.

In step S118, the extraction unit 290 requests the captured image from the on-board unit 20 of the vehicle 12 and starts extracting the captured image acquired from the on-board unit 20 of the vehicle 12.

In step S120, the extraction unit 290 determines whether the captured image is being extracted. When the captured image is being extracted, the process proceeds to step S122, the extraction of the captured image is terminated, and the extracted captured image is stored in the extracted image DB 170. On the other hand, when the captured image is not being extracted, the driving diagnosis process is terminated.

The CPU 30A also repeatedly executes the driving diagnosis process shown in FIG. 10 for diagnosing that the vehicle is significantly behind the vehicle ahead at the time of starting as an event requiring attention. Note that processing similar to that in FIG. 9 above will be described with the same reference signs.

In step S110 of FIG. 10, the acquisition unit 260 acquires the travel information of the vehicle 12 from the on-board unit 20 of the vehicle 12.

In step S112, the acquisition unit 260 acquires the information of the target from the on-board unit 20 of the vehicle 12.

In step S114, in the case where the recognized target is a vehicle ahead, when the flag indicates that there is a vehicle ahead, the preprocessing unit 270 records a vehicle ahead flag. Then, a filtering process is performed by replacing the flag indicating that there is a vehicle ahead with the maximum value in the certain section of 0.2 seconds before and after, to update all the flags in the certain section with the maximum value.

In step S116, the diagnosis unit 280 diagnoses whether an event requiring attention has occurred on the detection condition that the vehicle is significantly behind the vehicle ahead when starting at an intersection or in a traffic jam. When the detection condition is satisfied, it is diagnosed that an event requiring attention has occurred, and the process proceeds to step S118. On the other hand, when the detection condition is not satisfied, the process proceeds to step S120.

In step S118, the extraction unit 290 requests the captured image from the on-board unit 20 of the vehicle 12 and starts extracting the captured image acquired from the on-board unit 20 of the vehicle 12.

In step S120, the extraction unit 290 determines whether the captured image is being extracted. When the captured image is being extracted, the process proceeds to step S122, the extraction of the captured image is terminated, and the extracted captured image is stored in the extracted image DB 170. On the other hand, when the captured image is not being extracted, the driving diagnosis process is terminated.

In step S200, the extraction unit 290 determines whether the detection cancellation condition is satisfied on the detection cancellation condition that the stopped time of the vehicle 12>120 seconds holds, the distance from the vehicle ahead>15000 mm holds, or the vehicle 12 is turning right or left (the turn signal switch is ON). When the detection cancellation condition is not satisfied, the driving diagnosis process is terminated. On the other hand, when the detection cancellation condition is satisfied, the process proceeds to step S202.

In step S202, the extraction unit 290 deletes the diagnosis that an event requiring attention has occurred and the extracted captured image, and ends the driving diagnosis process.

Further, the CPU 30A repeatedly executes the above driving diagnosis process shown in FIG. 10 for diagnosing that the vehicle 12 does not stop despite the red light as an event requiring attention in the same manner for diagnosing that the vehicle 12 is significantly behind the vehicle ahead at the time of starting.

Here, in step S114, in the case where the recognized target is a signal of a traffic light, when the flag represents a red light, the preprocessing unit 270 records a red light flag. Then, a filtering process is performed by replacing the flag representing a red light with the maximum value in the certain section of 1 second before and after, to update all the flags in the certain section with the maximum value.

The preprocessing unit 270 records a green light flag when the flag represents a green light. Then, a filtering process is performed by replacing the flag representing the green light with the maximum value in the certain section of 1 second before and after, to update all the flags in the certain section with the maximum value.

In step S116, the diagnosis unit 280 diagnoses whether an event requiring attention has occurred on the detection condition that the vehicle does not stop despite the red light. When the detection condition is satisfied, it is diagnosed that an event requiring attention has occurred, and the process proceeds to step S118. On the other hand, when the detection condition is not satisfied, the process proceeds to step S120.

In step S200, the extraction unit 290 determines whether the detection cancellation condition is satisfied on the detection cancellation condition that the minimum vehicle speed is less than a threshold value (1 km/h), the turn signal switch is ON, the vehicle 12 is constantly 10 m or more away from the traffic light while recognizing a red light, or the traffic light is immediately switched from red to green. When the detection cancellation condition is not satisfied, the driving diagnosis process is terminated. On the other hand, when the detection cancellation condition is satisfied, the process proceeds to step S202.

Summary of Embodiment

The center server 30 of the present embodiment acquires the travel information related to travel of the vehicle and information as to whether the target has been recognized from the captured image captured by the camera mounted on the vehicle, and diagnoses that an event requiring attention has occurred when the detection condition based on the state of the target and the travel information is satisfied. Therefore, according to the center server 30, it is not necessary to transmit captured images for the driving diagnosis, which makes it possible to reduce the amount of communication with the vehicle when the driving diagnosis is performed outside the vehicle.

The center server 30 of the present embodiment extracts the captured image when the detection condition for an event requiring attention is satisfied. Therefore, according to the center server 30, it is possible to record the captured image when it is diagnosed that an event requiring attention has occurred.

Further, the center server 30 of the present embodiment deletes the extracted captured image when a predetermined detection cancellation condition based on the travel information is satisfied. Therefore, according to the center server 30, after it is once diagnosed that an event requiring attention has occurred, when it is diagnosed that an event requiring attention has not occurred, it is possible to delete the extracted captured image.

Remarks

It should be noted that various processors other than the CPU may execute the various processes that are executed when the CPU 20A and the CPU 30A read the software (program) in the above embodiment. In this case, a programmable logic device (PLD) in which a circuit configuration can be changed after manufacturing, such as a field-programmable gate array (FPGA), and a dedicated electric circuit or the like that is a processor having a circuit configuration specially designed to execute a specific process, such as an application specific integrated circuit (ASIC), are exemplified as a processor. Further, each process described above may be executed by one of these various processors, or by a combination of two or more processors of the same type or different types (for example, a combination of FPGAs, a combination of a CPU and an FPGA, and the like). Furthermore, the hardware structure of each of the various processors is, more specifically, an electric circuit in which circuit elements such as semiconductor elements are combined.

In the above embodiment, a state in which each program is stored (installed) in advance in a non-transitory computer-readable recording medium has been described. For example, the control program 100 in the on-board unit 20 is stored in advance in the ROM 20B, and the processing program 150 in the center server 30 is stored in advance in the storage 30D. However, the present disclosure is not limited to this, and each program may be provided in a format recorded in a non-transitory recording medium such as a compact disc read-only memory (CD-ROM), a digital versatile disc read-only memory (DVD-ROM), and a universal serial bus (USB) memory. Further, the program may be downloaded from an external device via a network.

The flow of processes described in the above embodiment is an example, and unnecessary steps may be deleted, new steps may be added, or the process order may be changed within a range that does not deviate from the gist.

What is claimed is:

1. An information processing device, comprising:
a processor configured to
acquire travel information related to travel of a vehicle and information as to whether a signal of a traffic light has been recognized from a captured image captured by a camera mounted on the vehicle,
when information indicating that the signal of the traffic light has been recognized is included in the information acquired during a certain section including a certain time, update information indicating that the signal of the traffic light is not recognized at the certain time with the information indicating that the signal of the traffic light has been recognized, and
generate a diagnosis that an event requiring attention has occurred each time there is the information indicating that the signal of the traffic light has been recognized, wherein the signal represents a red light, and the travel information indicates that the vehicle is not stopping.

2. The information processing device according to claim 1, wherein
the processor is configured to extract the captured image when a detection condition is satisfied.

3. The information processing device according to claim 2, wherein
the processor is configured to terminate extraction of the captured image when the detection condition is no longer satisfied.

4. The information processing device according to claim 2, wherein
the processor is configured to delete the extracted captured image when a predetermined detection cancellation condition based on the travel information is satisfied.

5. The information processing device according to claim 1, wherein
the processor is configured to,
in response to the vehicle being constantly 10 m or more away from the traffic light while recognizing the red light, delete the diagnosis that the event requiring attention has occurred, and
in response to the traffic light being immediately switched from red to green, delete the diagnosis that the event requiring attention has occurred.

6. The information processing device according to claim 1, wherein
the information processing device is a server configured to wirelessly communicate with the vehicle over a network, to acquire the travel information and the information as to whether a signal of a traffic light has been recognized, and
the processor is configured to generate the diagnosis that an event requiring attention has occurred, without using or acquiring the captured image captured by the camera mounted on the vehicle, thereby reducing an amount of communication with the vehicle over the network.

7. The information processing device according to claim 6, wherein the processor is configured to
in response to the generated diagnosis, perform image extraction comprising requesting the captured image from the vehicle, and storing the captured imaged in a database at the server, and
in response to a predetermined detection cancellation condition being satisfied based on the travel information, delete the captured imaged stored in a database and the diagnosis that an event requiring attention has occurred.

8. A non-transitory computer readable medium storing a program that causes a computer to execute processes comprising:
acquiring travel information related to travel of a vehicle and information as to whether a signal of the traffic light has been recognized from a captured image captured by a camera mounted on the vehicle;
when information indicating that the signal of the traffic light has been recognized is included in the information acquired during a certain section including a certain time, updating information indicating that the signal of the traffic light is not recognized at the certain time with the information indicating that the signal of the traffic light has been recognized; and
generating a diagnosis that an event requiring attention has occurred each time there is the information indicating that the signal of the traffic light has been recognized, wherein the signal represents a red light, and the travel information indicates that the vehicle is not stopping.

9. The non-transitory computer readable medium according to claim 8, wherein
the processes further comprise:
in response to the vehicle being constantly 10 m or more away from the traffic light while recognizing the red light, deleting the diagnosis that the event requiring attention has occurred, and in response to the traffic light being immediately switched from red to green, deleting the diagnosis that the event requiring attention has occurred.

10. A system, comprising: a vehicle and an information processing device, wherein the information processing device comprises a processor configured to acquire travel information related to travel of a vehicle and information as to whether a signal of a traffic light has been recognized from a captured image captured by a camera mounted on the vehicle, when information indicating that the signal of the traffic light has been recognized is included in the information acquired during a certain section including a certain time, update information indicating that the signal of the traffic light is not recognized at the certain time with the information indicating that the signal of the traffic light has been recognized, and generate a diagnosis that an event requiring attention has occurred each time there is the information indicating that the signal of the traffic light has been recognized, wherein the signal represents a red light, and the travel information indicates that the vehicle is not stopping, the information processing device is a server configured to wirelessly communicate with the vehicle over a network, to acquire the travel information and the information as to whether a signal of a traffic light has been recognized, and the processor is configured to generate the diagnosis that an event requiring attention has occurred, without using or acquiring the captured image captured by the camera mounted on the vehicle, thereby reducing an amount of communication with the vehicle over the network.

11. The system according to claim 10, wherein the processor is configured to in response to the generated diagnosis, perform image extraction comprising requesting the captured image from the vehicle, and storing the captured imaged in a database at the server, and in response to a predetermined detection cancellation condition being satisfied based on the travel information, delete the captured imaged stored in a database and the diagnosis that an event requiring attention has occurred.

12. The system according to claim 11, wherein the processor is configured to, in response to the vehicle being constantly 10 m or more away from the traffic light while recognizing the red light, delete the diagnosis that the event requiring attention has occurred, and in response to the traffic light being immediately switched from red to green, delete the diagnosis that the event requiring attention has occurred.

* * * * *